May 10, 1960    H. M. STEELE, JR., ET AL    2,936,387
STROBOSCOPE ILLUMINATION
Filed June 24, 1958
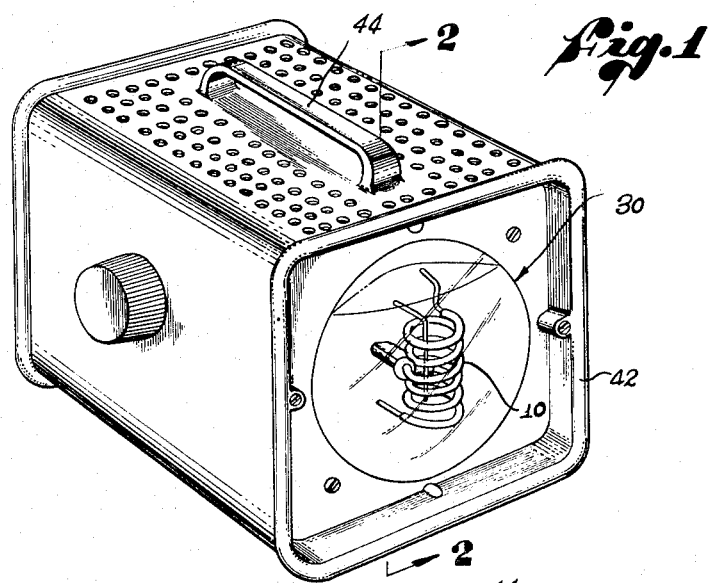
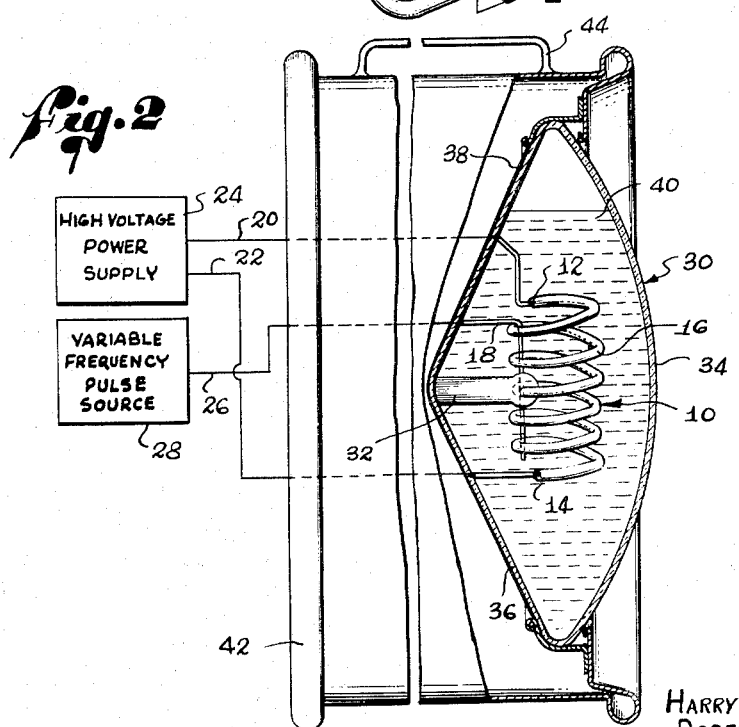
INVENTORS,
HARRY M. STEELE, JR.,
ROBERT L. KIDWELL

United States Patent Office 2,936,387
Patented May 10, 1960

2,936,387

STROBOSCOPE ILLUMINATION

Harry M. Steele, Jr., and Robert L. Kidwell, Phoenix, Ariz.; said Kidwell assignor to said Steele Application June 24, 1958, Serial No. 744,202

7 Claims. (Cl. 313—22)

The present invention relates generally to stroboscopic instruments, and more particularly to an instrument for providing high-frequency stroboscopic illumination.

Various stroboscopic instruments have been used to study the motion of a body which is undergoing rapid revolution or vibration, by rendering the body visible only at frequent intervals. One class of stroboscopic instruments are used in subdued light and render the object visible by illuminating it with intermittent light. If the frequency of the intermittent light is synchronized with the movement of the body, the body can be made to appear motionless because it is repeatedly viewed in the same position. As a result, the body is seen and can be studied in a state when subjected to motion and strain.

An apparatus for providing intermittent light satisfactory for stroboscopic illumination must have a very short transitional time between the states of "light on" and "light off." In the past, various apparatus employing cold-cathode electron discharge tubes, as neon bulbs, have been used to provide stroboscopic light without requiring mechanical arrangements. However, tubes of this type generally provide illumination of a relatively low intensity. Furthermore, conventional cold-cathode tubes have serious operating-frequency limitations. As a result, stroboscopic illumination units which incorporate conventional cold-cathode electron discharge tubes are normally only capable of providing low-intensity illumination at relatively low frequencies. The utility of a stroboscopic illumination instrument is directly related to the intensity and frequency of light it is capable of producing and the aforesaid low-intensity, low-frequency instruments are very limited in their application and do not begin to satisfy the need for stroboscopic illumination in research and industry.

In recent years, an illumination unit generally referred to as a "flash tube" or an "electronic flash lamp" has been developed. These units are capable of very high-speed operation between "on" and "off" states, and furthermore provide illumination of a high intensity. However, the practical use of electronic flash lamps in the past has been limited to situations in which only a few flashes of light are required during an interval of operation. For example, electronic flash lamps have been widely employed in the photographic field wherein a single light flash serves to illuminate a subject to be photographed, or a few flashes illuminate an object in several stages of motion which are recorded on a photograph. The use of electronic flash lamps has been restricted because of the rapid deterioration of these units when subjected to rapidly-recurring operation, as in providing stroboscopic illumination.

Generally, electronic flash lamps comprise a gas-filled tube of glass, which may be helical in form, with anode and cathode electrodes mounted in the ends of the glass tube. A triggering electrode is then provided, which may contact the glass tube, and which functions to create an electrical field which ionizes the gas inside the tube and thereby triggers an electrical discharge between the electrodes to provide illumination. If the electronic flash lamp is used to produce high-frequency light for an interval of time greater than a few seconds, a hot spot in the lamp (which results from the electrical discharges) produces considerable heat that normally causes the lamp to fail, as by developing hairline cracks in the glass tube. Various techniques have been proposed for preventing the rapid deterioration of electronic flash lamps; however, a need remains for an apparatus which is capable of using an electronic flash lamp to provide stroboscopic light over an extended interval.

The present invention provides an apparatus, utilizing an electronic flash lamp, which may be used to provide stroboscopic illumination (of a high intensity and frequency), over an extended interval of time. According to the invention, an electronic flash lamp is mounted in a chamber which has a light-transmissive wall. A light-transmissive high-dielectric fluid is then placed in the chamber to contact the electronic flash lamp. Means are provided to energize the flash lamp to provide stroboscopic illumination and the fluid contacting the lamp distributes the heat generated by the lamp thereby normally permitting the apparatus to operate over an extended interval without damaging the lamp. It is noteworthy that an electronic flash lamp operating in an apparatus constructed in accordance with the principles of the present invention has been experimentally shown to have an effective life many thousands of times the effective life of a similar lamp operated in a conventional manner.

It is therefore a major object of the present invention to provide an improved stroboscopic illumination apparatus which is economical to manufacture.

Another object of the present invention is to provide an improved apparatus capable of providing high-frequency stroboscopic illumination.

A further object of the present invention is to provide an economical apparatus which is capable of providing high-intensity stroboscopic illumination.

Still another object of the present invention is to provide an apparatus incorporating an electronic flash lamp, wherein the effective life of the flash lamp is very greatly increased.

These and other objects and advantages of the present invention will become apparent from the following specification and accompanying drawings in which:

Figure 1 is a perspective view of a stroboscopic illumination instrument constructed in accordance with the principles of the present invention; and Figure 2 is a sectional view taken along line 2—2 of Figure 1 and further including a diagram to illustrate the electrical system of the present invention.

Referring now to the drawing there is shown a flash tube, i.e. an electronic flash lamp 10. The lamp 10 may take various forms, for example, the lamp may be a type manufactured by the General Electric Company and designated FT 220, having an anode 12 and a cathode 14 sealed in a helical glass tube 16. A trigger electrode 18 is positioned to contact a wall of the glass tube 16. The anode 12 and the cathode 14 are connected by conductors 20 and 22, respectively, to a high-voltage power supply 24. The power supply 24 may comprise various well-known apparatus, and if used in conjunction with the above-named type lamp provides a voltage of approximately 1600 volts.

The trigger electrode 18 of the lamp 10 is connected through a conductor 26 to a variable-frequency pulse source 28 which provides high-voltage pulses of variable-frequency. If the lamp recited above as an example is used in the system, the pulse source 28 provides pulses having a peak amplitude of some 16,000 volts. Of course, various electrical circuits are well-known in the prior art for providing pulses of this amplitude at a variable repetition rate; therefore, such circuits are not described herein.

The lamp 10 is centrally supported in a chamber 30 by a bracket 32. The bracket 32, which serves to support the lamp 10 within the chamber 30, may be formed of glass, ceramic, or various other materials which have good insulating characteristics. The chamber 30 is formed by a light-transmissive concave wall 34 of uniform thickness which is integral with a uniform concave wall 36 having a reflective coating 38 thereon. The chamber 38 may for example be entirely of glass with the coating 38 of metal applied by evaporation to the wall 36.

A light-transmissive liquid partially fills the chamber 30 so that the lamp 10 is contacted by the liquid regardless of the position in which the apparatus is placed. The air space or an evacuated space in the chamber allows for volumetric changes by the liquid 40. The liquid 40 is a high dielectric substance and therefore insulates the electrical conductors in the chamber 30. Additionally, it is advantageous if the liquid 40 is a low-viscosity liquid, for example of 50 to 500 centistokes, and has good optical qualities. An example of one liquid which has been found satisfactory for use in the apparatus of the present invention is silicone oil. The low viscosity of a liquid permits rapid convection flow and promotes a high and uniform rate of heat dissipation.

The chamber 30 containing the liquid 40 and the lamp 10 is mounted in a housing 42 to afford protection and convenient handling for the apparatus. A handle 44 is incorporated in the housing 42. The power supply 24 and the pulse source 28 may be enclosed by the housing 42 or separately housed from the lamp unit.

In operating the apparatus of the present invention, the unit is positioned so that the light from the lamp 10 passes through the wall 34 to impinge upon the body to be studied while in motion. The high-voltage power supply 24 is then energized to apply a high voltage to the column of gas in the tube 16 between the anode 12 and the cathode 14. Next, the variable-frequency pulse source 28 is energized to apply high voltage pulses to the electrode 18 through the conductor 26, thereby causing the gas in the tube 16 to be repeatedly ionized resulting in electrical discharges between the anode 12 and the cathode 14. The electrical discharges produce light flashes of a high intensity which pass through the wall 34 and illuminate the body under observation. The frequency of the pulses from the pulse source 28 is then varied until a predetermined relationship exists between the frequency of the stroboscopic illumination from the lamp 10 and the movement of the body under observation. When such a relationship is established, the moving body appears motionless and may be observed and studied visually.

During each electrical discharge between the anode 12 and the cathode 14 a hot spot is formed in the glass tube 16, the cumulative effect of which would normally destroy a flash lamp used to provide stroboscopic light. However, the liquid 40 contacting the glass tube 16 distributes the heat adequately to preserve the lamp. The distribution of the heat produced by the electrical discharge in the lamp thus prolongs the life of the unit even at relatively high frequencies.

It may therefore be seen that an important feature of the present invention is the provision of an apparatus capable of providing high-frequency stroboscopic illumination of a high intensity. For example, units constructed in accordance with the present invention may be operated satisfactorily at a frequency of 400 cycles per second. Another important feature of the present invention is the provision of a non-mechanical stroboscopic instrument which is economical to manufacture and has an extended useful life.

It should be noted that although the particular embodiment of the invention herein shown and described is fully capable of providing the advantages and achieving the objects herein previously set forth, such embodiment is merely illustrative and this invention is not limited to the details of construction illustrated and described herein except as defined in the appended claims.

We claim:
1. A stroboscope comprising: a chamber having a light-transmissive wall; an electronic flash lamp mounted in said chamber having electrical conductors adapted to be connected to be energized; and a light-transmissive electrically-insulating fluid in said chamber to contact said electrical conductors of said electronic flash lamp.

2. An instrument for providing stroboscopic light comprising: a chamber having a light-transmissive wall and a reflective surface opposed thereto; an electronic flash lamp mounted in said chamber and adapted to be energized; and a light-transmissive electrically insulating fluid in said chamber to contact the entire external surface of said electronic flash lamp.

3. An instrument for providing stroboscopic light comprising: a chamber having a light-transmissive wall; an electronic flash lamp mounted in said chamber and adapted to be energized; and a high-dielectric light-transmissive liquid of low viscosity in said chamber to envelop and contact said electronic flash lamp.

4. An instrument for providing stroboscopic light comprising: a chamber having a light-transmissive wall and a reflective surface opposed thereto; a housing encasing a portion of said chamber; an electronic flash lamp mounted in said chamber and having conductors adapted to be connected to a source of high voltage electrical energy and to a source of triggering pulses; and a silicone oil in said chamber enveloping said electronic flash lamp whereby to contact at least one of said conductors.

5. An instrument for providing stroboscopic light comprising: a chamber having a light-transmissive wall and a reflective surface opposed thereto; an electronic flash lamp mounted in said chamber and adapted to be connected to a source of high voltage electrical energy and to a source of triggering pulses; and a light-transmissive insulating liquid partially filling said chamber to maintain said flash lamp enveloped in said liquid regardless of the position of said instrument.

6. An instrument for providing stroboscopic light comprising: a chamber including a uniform concave light-transmissive wall integral with a uniform concave light-reflective wall; a housing encasing a portion of said chamber; an electronic flash lamp mounted in said chamber and having conductors adapted to be connected to a source of high voltage electrical energy and to a source of triggering pulses; and a liquid partially filling said chamber to maintain said lamps enveloped and contact said conductors, said liquid having low viscosity, good optical characteristics and good electrical insulating characteristics.

7. An instrument for providing stroboscopic illumination, comprising: a closed glass tube; first and second electrodes mounted in said tube; a trigger electrode contiguous to said glass tube; a chamber containing said glass tube and having a light-transmissive wall; electrical conductors connected from said electrodes to a location outside said chamber and adapted to be connected to provide potential across said first and said second electrodes and pulses to said trigger electrode; and a light-transmissive electrically-insulating liquid in said chamber enveloping said glass tube.

References Cited in the file of this patent

UNITED STATES PATENTS

| 1,805,503 | Wantz | May 19, 1931 |
| 1,952,306 | Bird | Mar. 27, 1934 |
| 1,966,083 | Schroter | July 10, 1934 |
| 2,300,892 | Harada et al. | Nov. 3, 1942 |
| 2,358,796 | Edgerton | Sept. 26, 1944 |

FOREIGN PATENTS

| 831,683 | Germany | Feb. 18, 1952 |